United States Patent [19]

Clausen et al.

[11] Patent Number: 5,614,452
[45] Date of Patent: Mar. 25, 1997

[54] METHOD OF CONVERTING ASBESTOS CEMENT INTO A HARMLESS PRODUCT

[75] Inventors: Anders U. Clausen, Koge; Vermund R. Christensen, Roskilde; Soren L. Jensen, Copenhagen, all of Denmark

[73] Assignee: Rockwool International A/S, Denmark

[21] Appl. No.: 525,590

[22] PCT Filed: Apr. 19, 1994

[86] PCT No.: PCT/EP94/01215

§ 371 Date: Sep. 8, 1995

§ 102(e) Date: Sep. 8, 1995

[87] PCT Pub. No.: WO94/23801

PCT Pub. Date: Oct. 27, 1994

[30] Foreign Application Priority Data

Apr. 20, 1993 [DK] Denmark .................................... 443/93

[51] Int. Cl.$^6$ .................................................... C04B 35/00
[52] U.S. Cl. ........................ 501/155; 106/699; 106/702; 264/5; 264/333; 264/DIG. 19; 588/254
[58] Field of Search ................................ 106/699, 702; 501/155; 588/254; 264/5, 333, DIG. 19

[56] References Cited

U.S. PATENT DOCUMENTS

| | | | |
|---|---|---|---|
| 3,334,010 | 8/1967 | Moore | 106/702 |
| 3,954,556 | 5/1976 | Jackson et al. | 106/702 |
| 4,678,493 | 7/1987 | Roberts et al. | 501/155 |
| 4,818,143 | 4/1989 | Chou | 106/699 |
| 4,820,328 | 4/1989 | Roberts et al. | 501/155 |

FOREIGN PATENT DOCUMENTS

| | | |
|---|---|---|
| 265051 | 4/1988 | European Pat. Off. . |
| 344563 | 12/1989 | European Pat. Off. . |
| 568367 | 11/1993 | European Pat. Off. . |
| 4211161 | 10/1993 | Germany . |
| 2307836 | 5/1989 | Japan . |
| 9100123 | 1/1991 | WIPO . |

*Primary Examiner*—Anthony Green
*Attorney, Agent, or Firm*—Brumbaugh, Graves, Donohue & Raymond

[57] ABSTRACT

Asbestos cement may be converted to a harmless product by melting at a melt temperature of 1400° to 1700° C. a blend of 50 to 85% by weight asbestos cement with 15 to 50% by weight of additives that include naturally occurring silicate material such that the total blend has a CaO content of not more than 50%. The melt is discharged from the furnace, cooled and solidified and may be used as aggregate or, generally after solidification as regular units, may be used as part or all of the charge for producing MMV fibre material. It is of particular value for the production of man made vitreous fibre material that has low alumina content and is soluble in lung fluids.

14 Claims, No Drawings

METHOD OF CONVERTING ASBESTOS CEMENT INTO A HARMLESS PRODUCT

BACKGROUND OF THE INVENTION

This invention relates to the conversion of asbestos cement products (which are considered to be harmful because of their content of asbestos fibre) into a harmless product, namely a product that is substantially free of asbestos fibres and so is considered to be inherently much less harmful than the starting asbestos cement product. This harmless product can be, for instance, an aggregate or a product comprising synthetic mineral fibres, which can alternatively be named as Man Made Vitreous Fibres (MMV fibres).

The health hazards which are associated with asbestos-containing products have resulted in a ban on the use of such products in new constructions and in the need to find environmentally acceptable ways of disposing of existing asbestos-containing products.

These problems are associated both with products having a very high content of asbestos fibre, such as asbestos insulation and other fibrous material and products having lower contents of asbestos such as asbestos cement products.

One way of attempting to dispose of asbestos-containing products is by dumping them at special sites under conditions such that asbestos fibres cannot subsequently escape, for instance by wrapping the products in plastic foil. This is particularly inconvenient for rigid, bulky products such as asbestos cement products.

There have been several proposals in the literature for rendering asbestos products harmless by heating the products.

In EP-A-344563 chrysotile asbestos is heated at a temperature of at least 580° C. (eg. up to 650° C.) so as to eliminate crystal-bonded water and convert the fibrous chrysotile asbestos into non-fibrous mineral forsterite.

In EP-A-265051 it is proposed to heat fibrous asbestos in an induction furnace at a temperature preferably between 1400° and 1500° C. in the absence of any additives, and the melt is then discharged from the furnace and the product can be used in the ceramic or glass industries or as an adhesive or as a land fill. Although it is mentioned in EP265051 that asbestos can occur as an asbestos cement product, normal asbestos cement has a melting point in the range 1800° C. to 2000° C. or more and so clearly asbestos cement cannot be used in the described process of EP-A-265051.

In DE-A-4211161 asbestos products are rendered harmless by heating in a non-aqueous system at a temperature of not more than 1300° C. The asbestos is subjected to the heating in the form of a blend with various additives. In some of the examples the asbestos is introduced as asbestos fibre and the blend is stated to melt during the heating at below 1300° C. In other examples, the asbestos is introduced as a minor component (for instance 33 to 42% based on the dry weight) of a blend of asbestos cement and additives, and the heating is said to result in sintering. The combination of the asbestos cement and the amount and type of additives would not cause melting at the exemplified temperatures (eg. 1000° C.).

In U.S. Pat. No. 4,820,328 asbestos is converted into a glass by adding asbestos to a melt in an electric glass melting furnace in a particular way, at a temperature of at least 1000° C. It is stated that the preferred temperature is 350° C. to 1380° C. corresponding to a temperature of about 250° C. at the top of the molten glass.

Although it is stated that 100% blue asbestos can be melted, preferably the asbestos is produced as a blend with glass cullet (waste glass) and usually also with caustic soda. In the examples, temperatures ranging from 1050° C. to 1380° C. are mentioned. It is stated that a blend of 78% asbestos and 22% cullet could be melted; the data in example 1 clearly shows the need to use large amounts of cullet, and usually also caustic soda, if satisfactory melting is to be obtained in that example. Thus the example shows that none of the blends that contain 50% asbestos or more provide a satisfactory melt. Instead, satisfactory melts are obtained only when asbestos is in an amount of 40% or less and caustic soda is present in an amount of at least 10%.

There is a reference in U.S. Pat. No. 4,820,328 to the fact that the asbestos that can be used in the invention can include asbestos cement materials. However it is clear that simple replacement of the asbestos fibre in the examples with asbestos cement would not be possible because asbestos cement has a melting point (1800° C. to 2000° C. or more) very much higher than any of the melting temperatures mentioned in U.S. Pat. No. 4,820,328.

Because of the very large amounts of asbestos cement boards, roofing, piping and other products that are having to be disposed of, there is an acute need of developing a cost effective and efficient way of rendering such products harmless, and which is more environmentally friendly than merely wrapping the asbestos cement in plastic and dumping it. No economic way has previously been proposed. As shown above, the literature is misleading in suggesting (erroneously) that it is possible to melt asbestos cement under conditions similar to those proposed for melting a charge consisting of asbestos fibre or asbestos fibre with glass.

Although melting asbestos cement by itself would, in theory, render it harmless, in practice this is not a viable process. The melting would require very high temperatures (at least 1800° C.) and the melt would be highly corrosive because of the high calcium content of the asbestos cement. It is not practicable, in a cost effective process, to provide a furnace that can withstand this combination of temperature and corrosiveness.

BRIEF SUMMARY OF THE INVENTION

An object of the invention therefore is to provide a cost effective method for rendering asbestos cement harmless and, in particular, to provide such a method that yields a product that is economically useful and that, preferably, can be converted into MMV fibres.

Thus a particular object of the invention is to start with an environmentally unacceptable asbestos fibre product (asbestos cement) and to convert it into an environmentally acceptable MMV fibre product.

A process according to the invention for converting asbestos cement to a harmless product comprises heating in a furnace a blend of asbestos cement and additives, wherein at least 50% by weight of the additives is naturally occurring silicate material the additives have a content of $SiO_2+Al_2O_3$ which is at least 60% by weight of the additives, the blend comprises 50 to 85% by weight asbestos cement and 15 to 50% by weight of the additives, the blend of asbestos cement and the additives has a content of CaO of not more than 50% by weight of the blend, the blend of asbestos cement and the additives is melted in the furnace by heating to a temperature between 1400° C. and 1700° C. at which the blend is molten, and the molten blend is discharged from the furnace and is cooled and solidified.

The invention thus provides a very simple and economically cost effective way of disposing of asbestos cement and converting it to a harmless and useful product. Indeed, the process can be conducted in conventional electric and other furnaces having refractory linings that are convention for, for instance, the melting of mineral melts such as rock.

DESCRIPTION OF THE PREFERRED EMBODIMENT

The additive has to be selected in accordance with the definition given above and additives such as those proposed in U.S. Pat. No. 4,820,328 are not suitable. For instance, if asbestos cement is blended with just sufficient glass cullet to reduce its melting point to, for instance, 1700° C., the resulting blend would have an unacceptably high CaO content and would be corrosive. If sufficient glass cullet and caustic soda is added to reduce the melting point of typical asbestos cement to more convenient temperatures such as the 1350° to 1380° C. range in U.S. Pat. No. 4,820,328 (or the temperatures used in the invention), the corrosiveness of the melt may become less of a problem but the amount of additives is so large (the asbestos cement constituting well under 50% (and often under 40%) of the blend) that the furnace and the amount of energy required for operating the furnace both become unacceptably large. Thus a large proportion of the total amount of energy merely goes into melting the additive, and much of this heat energy is wasted when the additive (as part of the final product) is discharged from the furnace and solidifies.

The asbestos cement products that can be treated in the invention can be any conventional asbestos cement products such as asbestos cement boards, pipes and roofing and comprise a cement matrix in which asbestos fibres are embedded, usually in an amount of 5 to 20% by weight of the product, typically around 10% by weight.

The asbestos cement is provided in the furnace as a blend with additives, either as a result of being mixed in the furnace or as a result of being pre-blended. The amount of the additives is about 15 to 50% by weight of the blend, most preferably around 20 to 40% by weight of the blend. Thus the asbestos cement is preferably 60 to 80% by weight of the blend.

The additives (ie. the total combination of additives) must have a high content of $SiO_2+Al_2O_3$ which in practice is always at least 60%, usually at least 70%, by weight of the total additives. An alternative way of describing the total additives is to state that the additives have a low content of calcium oxide and a low content of alkali metal oxide. In practice the amount of CaO should be not more than 40% (usually below 30 and most usually below 20%) and the amount of $Na_2O+K_2O$ is not more than 20% and usually not more than 10% by weight of the additives.

At least 50% by weight of the additives and frequently more, for instance 60%, 70% or 80% and frequently substantially all the additives, must be a silicate material which is selected to provide an optimum cost effectiveness to the blend.

This major component of the blend is naturally occurring silicate material. Such materials are cost effective as additives and it is possible, by review of the wide range of silicate materials that are naturally occurring, to select such materials which are cost effective and which, when used in economically acceptable proportions, will result in a desired chemical composition and liquidus temperature of the blend.

The naturally occurring silicate material, and often at least 50%, or each component, in the additives may be a silicate material which has a very high content of $SiO_2+Al_2O_3$, usually at least 60 or 70% by weight and typically at least 80% by weight, since the inclusion of such materials facilitates the attainment of a blend having a suitable liquidus temperature and the desired acceptably low Cao content whale using relatively small amounts of this particular additive.

Preferred naturally occurring silicate materials which can be used in the invention include quartz sand, sandstone, diabase, basalt, gabbro, pyroxenite, olivine sand, anorthosite, syenite, andesite, trachyte, diopside- or wollesretire-rich rocks, clay and kaolin.

When referring above to naturally occurring silicate materials, we mean silicate materials that occur naturally in the environment and which either have not been used for other purposes prior to use in the invention or are reclaimed materials that have been used for other purposes wherein these other purposes have not resulted in melting the additive prior to being used in the invention.

If a minor proportion of the additive is provided by materials which are neither naturally occurring silicate materials nor the high (above 70%) $SiO_2+Al_2O_3$ materials discussed above, these other additives and their amount should be selected having regard to the chemical analysis and physical properties required for the final melt. They can include asbestos fibres themselves but more usually are selected from materials such as iron ore and waste materials such as acid slags, concrete, glass, tile, and MMV wool.

It is often preferred to use additives wherein at least 50% and preferably up to 100%, of the additives are relatively low melting point rock materials such as andesite and trachytes. In other systems it is preferred to use naturally occurring high $SiO_2$ products such as quartz sand or olivine sand, especially when low $Al_2O_3$ is preferred.

Since, for economic reasons, the melt temperature in the invention is maintained at not more 1700° C. (and preferably 1400° to 1550° C.) it is generally necessary that the blend of additives and asbestos cement should give a liquidus temperature of not more than 1600° C., preferably below 1450° C. and most preferably below 1300° C. The liquidus temperature is the temperature at which the entire blend is just melted. Generally the melt temperature should be at least 100° C. above the liquidus temperature.

Generally, the melt temperature is in the range 1400° C. to 1700° C. Preferably, the melt temperature is between 1400° and 1550° C.

The blend of asbestos cement and additives must be such that the corrosiveness of the blend is acceptable for the furnace that is being used. In practice this generally means that the blend should have a CaO content of not more than 50%, preferably not more than 45%. The CaO content can be as low as possible, for instance below 30° in some blends.

The amount of $SiO_2+Al_2O_3$ in the blend is usually at least 35% and preferably at least 45%, but is usually not more than 60% and preferably not more than 50%.

Preferably the blend of asbestos cement and additives is such that the blend, and therefore the melt, has composition within the ranges

| | |
|---|---|
| SiO$_2$ | 35–75% by weight |
| Al$_2$O$_3$ | 2–45% by weight |
| TiO$_2$ | 0–10% by weight |
| FeO | 0–20% by weight |
| CaO | 10–50% by weight |
| MgO | 2–40% by weight |
| Na$_2$O | 0–10% by weight |
| K$_2$O | 0–10% by weight |
| Other oxides | 0–20% by weight |

In this specification, values quoted as FeO are intended to represent the total of iron expressed as FeO, irrespective of the oxidation state of the iron.

These "other oxides" may be omitted but if they are present they may be for instance P$_2$O$_5$ and/or B$_2$O$_3$, generally each in an amount of not more than 10%, typically 5–10%. However any non-interfering element can be used, particularly if it has beneficial effects, such as improved solubility in lung fluids. The total amount of such additional elements is generally not more than 10 or 20%, calculated as oxides. Usually each such element is present in an amount of not more than 5 or 10%.

It will be understood by those skilled in the art that, for any particular blend, the proportions of components have to be selected (generally within the ranges quoted above) so as to obtain a blend having an appropriate liquidus temperature. In particular, it will be understood that not every possible combination of elements, within the range quoted above, will provide a blend having an appropriate liquidus temperance.

For instance suitable blends often have Al$_2$O$_3$+SiO$_2$ as much as 90% or more when the amount of Al$_2$O$_3$ is relatively low, but if the amount of Al$_2$O$_3$ is increased (eg, above 25%) it may be appropriate to reduce Al$_2$O$_3$+SiO$_2$ to around 60% in order to maintain a suitable liquidus temperature.

Preferred salt have a composition within the range

| | |
|---|---|
| SiO$_2$ | 35–66% by weight |
| Al$_2$O$_3$ | 2–35% by weight |
| TiO$_2$ | 0–10% by weight |
| FeO | 0–10% by weight |
| CaO | 10–45% by weight |
| MgO | 2–30% by weight |
| Na$_2$O + K$_2$O | 0–7% by weight | but may additionally include P$_2$O$_5$ and for B$_2$O$_3$ and/or other oxides generally in a total amount of not more than 20%. Again, it is necessary, within these ranges, to select proportions that give an appropriate blend, preferably with a melt temperature in the range 1400° to 1550° C. This particular combination of elements is particularly valuable for the production of MMV fibres.

When the melt is to be used for the production of MMV fibres it is generally preferred to minimise the amount of alumina in the melt and so preferred blends have an alumina content of below 10% and preferably below 4%. The additives for the production of such a blend therefore should have a very low alumina content and it is particularly preferred that at least 50%, preferably at least 80% and often substantially all, the additives are quartz sand and olivine sand.

The furnace that is used for the process can be any furnace provided with heating means adequate for generating the required melt temperature and a lining that is resistant to corrosion by the melt. Because, in the invention, it is possible to formulate the melt so that it has a corrosiveness typical of rock melts, lining conventional for resisting rock melts can be used. The furnace can therefore be a conventional cupola furnace but is preferably a conventional lined electric furnace.

Although the solidified blend may subsequently be remelted, especially if it is to be used for forming MMV fibre material, it is preferred that this remelting should be conducted in a different furnace at a different location. In order to minimise environmental problems that are associated with handling asbestos cement, the furnace used for melting the asbestos cement products may be designed and positioned having particular regard to environmental considerations, and the solidified product from this furnace can then be used in conventional manner. Accordingly the furnace can be located close to the origin of the asbestos cement products that are to be destroyed and it is not essential in the invention to transport the asbestos cement products, possibly over long distances, to furnaces equipped for making MMV fibre material (although if desired MMV fibre material can be made direct from the melt).

The furnace for melting the asbestos cement is preferably provided with equipment for receiving closed containers, by which the asbestos cement products are transported to the furnace, and for achieving dust-free emptying of the transportation containers either direct into the furnace or direct into a store which in turn leads direct into the furnace. The additives that are to be incorporated with the asbestos cement in the furnace maybe added separately into the furnace or may be added into the asbestos cement products before they are fed into the furnace.

A suitable furnace for use in the invention is capable of converting about 10 tons of asbestos cement material per production hour, and thus each plant conveniently can convert about 40,000 tons of asbestos cement waste products per year.

The melt can be discharged and solidified by a conventional MMV fiberising process, but is usually discharged and solidified as a bulk product such as a slab or block or brick. This can be used without further melting. For instance it can be used as an aggregate, e.g., for road surfaces. In order to promote its formation as an aggregate of sharp-edged gains it may be desirable to quench the molten blend.

Generally, however, the molten blend is solidified in the form of regular units, for instance by casting it in moulds to provide products which can be in the shape of plates or blocks. These plates, blocks or other regular units can then be used as part or all of the charge to a furnace that provides a melt by which synthetic mineral fibre material can be formed. Thus the moulded units can be transported to an existing plant for making synthetic mineral fibres and may be used as part or all of the charge in that plant. Typical plates or blocks have dimensions 50–250×100–250×100–250 mm.

The moulded units or other solidified blend may be used alone or with raw materials conventionally used in the production of MMV fibres, and the resultant charge can be heated to form a melt and fiberised in conventional manner. For instance it can be heated in an electric furnace or, more usually, with coke in a cupola furnace. If the solidified blend has the chemical composition that is required for manufacture of the MMV fibres, then the solidified blend may be used as the sole mineral component of the fibre-forming melt, but more usually the solidified blend is used merely as a part, for instance at least 30%, of the mineral charge. The remainder may be conventional materials such as waste inorganic insulation material and conventional rock materials such as diabase, basalt, quartz sand, olivine sand, or slag materials.

It is particularly preferred that the MMV fibres should be soluble in lung liquids and for this purpose it is preferred that they should have a low content of $Al_2O_3$, generally less than 4%. The additives used in the initial blend with asbestos cement, and any additives in the charge for forming the fibre product, should therefore be selected so that the fibres obtained from the final charge have an acceptable solubility in lung fluids. For this purpose it is particularly preferred that the additives used with the asbestos cement should have a low content of $Al_2O_3$ and preferably quartz sand and/or olivine sand is used as at least half, and often more, of the total additives used in the total process. Suitable analyses of the melt, when solubility in lung fluid is required, are known from the literature, for instance Danish patent applications 1566/92, and 1568/92. A content of $P_2O_5$ and/or $B_2O_3$ in amounts of up to 20%, generally in amounts of 5–10% of one or both, may be used for the manufacture of soluble MMV fibres. Typical analyses of suitable fibres are

| $SiO_2$ | 53.5–64% by weight |
| $Al_2O_3$ | $\leq$4% by weight |
| CaO | 10–20% by weight |
| MgO | 10–20% by weight |
| FeO | 6.5–9% by weight |
| $P_2O_5 + B_2O_3$ | 0–20% by weight |

Another analysis of suitable fibres is

| $SiO_2$ | 53.5–65% by weight |
| $Al_2O_3$ | $\leq$4% by weight |
| CaO | 15–30% by weight |
| MgO | 5–15% by weight |
| FeO | $\leq$4% by weight |
| $P_2O_5 + B_2O_3$ | 0–20% by weight |

In each of these analyses, there may additionally be minor amounts of other, non-harmful, elements. The amount of $P_2O_5$ is usually 0–10%, often 5–10%. The amount of $B_2O_3$ usually 0–10%, often 5–10%.

A difficulty prior to the invention in the production of low $Al_2O_3$-content mineral fibres has been that starting materials having a suitable low aluminium content are only available in limited amounts in nature, and therefore the costs associated with the production of the soluble fibres have been rather high. By the invention, it is possible to start from an environmentally harmful waste product and achieve fibres having low alumina content in an economically acceptable process. For instance the starting materials for the production of such fibres could be 50% asbestos cement, 37% quartz sand and 13% olivine sand.

When the MMV fibres are to be made from the initial melt obtained with the asbestos cement, the additives in the blend containing the asbestos cement must be selected such that the melt has the composition that is required for the MMV fibres. However if the fibre production is to be effected on the basis of a melt formed in a cupola furnace, it will, as mentioned above, be advantageous to initially produce plates or blocks from the above starting materials and then to use the plates or blocks for the charging of the cupola furnace, or by using plates or blocks having a higher content of converted asbestos cement in combination with other raw materials.

The molten charge may be converted into MMV fibre material by extrusion through a spinning cup or by pouring on to a spinner comprising at least two co-operating spinning wheels in conventional manner (for instance as described in U.S. Pat. No. 4,105,425 or WO92/06047).

The following are examples of the invention.

EXAMPLE 1

Conventional MMV fibres

Crushed asbestos cement boards are admixed with quartz sand in the ratio of 80% of asbestos cement boards containing 10% of chrysotile asbestos to 20% of quartz.

The mixture is charged to an electrode-heated electric furnace and melted at 1550° C. The melt is moulded in the form of tiles in moulds with the dimensions 50×200×200 mm.

The composition of the melt thus obtained is:

| $SiO_2$ | $Al_2O_3$ | $TiO_2$ | FeO | CaO | MgO | $Na_2O$ | $K_2O$ |
| --- | --- | --- | --- | --- | --- | --- | --- |
| 45.2 | 3.3 | 0.3 | 1.5 | 43.3 | 4.8 | 0.2 | 0.5 |

The moulded tiles are used as raw material in a cupola furnace in the following charge:
40% of tiles (of the above composition)
60% of diabase
15% of coke
The following chemical composition was obtained:

| $SiO_2$ | $Al_2O_3$ | $TiO_2$ | FeO | CaO | MgO | $Na_2O$ | $K_2O$ |
| --- | --- | --- | --- | --- | --- | --- | --- |
| 44.4 | 10.3 | 1.6 | 6.5 | 20.1 | 8.9 | 2.1 | 0.9 |

The melt formed is converted into MMV fibres on a 4-wheel centrifugal spinner.

EXAMPLE 2

Soluble MMV fibres

Crushed asbestos cement boards containing 10% of chrysotile fibres are mixed with quartz sand in the following charge:
25% of quartz sand to 75% of asbestos cement boards.
The mixture is charged to the electric furnace and melted at 1550° C.
The following chemical composition is obtained:

| $SiO_2$ | $Al_2O_3$ | $TiO_2$ | FeO | CaO | MgO | $Na_2O$ | $K_2O$ |
| --- | --- | --- | --- | --- | --- | --- | --- |
| 47.7 | 3.2 | 0.3 | 1.4 | 41.1 | 4.5 | 0.2 | 0.6 |

The moulded tiles are charged to a cupola furnace together with cement briquettes:
50% of tiles (of the above composition)
50% of cement briquettes
15% of coke
Cement briquette composition:
13% of cement
30% of quartz sand
51% of mineral wool waste
2% of olivine sand
4% of iron ore
The following MMV fibre composition is obtained:

| $SiO_2$ | $Al_2O_3$ | $TiO_2$ | FeO | CaO | MgO | $Na_2O$ | $K_2O$ |
| --- | --- | --- | --- | --- | --- | --- | --- |
| 56.4 | 3.5 | 0.3 | 2.4 | 28.2 | 7.1 | 0.5 | 0.7 |

The fibre material is formed by discharging the melt onto a 4-wheel spinner.

EXAMPLE 3

When 100 t of an asbestos cement is converted into a melt using the additives described in U.S. Pat. No. 4,820,328 for use with asbestos fibres, this requires the addition of 150 t of additives in the form of 135 t of waste glass and 15 t of soda and requires an amount of heat of 690 GJ. When 100 t of similar asbestos cement is converted to a melt in the invention, only 25 t of additives in the form of (quartz) sand need be used and the process requires only 385 GJ heat. Thus, in this example, the invention uses less than one fifth of the amount of additives and only slightly above half the amount of energy and can more easily be adapted to give low-$Al_2O_3$ fibres and a relatively non-corrosive melt.

We claim:

1. A process for converting asbestos cement to a harmless product comprising heating in a furnace a blend of asbestos cement and an additive said additive comprising at least 50% by weight of naturally occurring silicate material, and at least 60% by weight of $SiO_2+Al_2O_3$, the blend comprising 50 to 85% by weight asbestos cement and 15 to 50% by weight of the additive, the blend of asbestos cement and the additive having a content of CaO of not more than 50% by weight of the blend, the blend of asbestos cement and the additive being melted in the furnace by heating to a temperature between 1400° C. and 1700° C. at which the blend is molten, the blend having a liquidus temperature of not more than 1600° C., and discharging the molten blend from the furnace and cooling and solidifying the molten blend.

2. A process according to claim 1 in which the blend of asbestos cement and the additive has an analysis, expressed by weight of oxides, which comprises:

| | |
|---|---|
| $SiO_2$ | 35–75% |
| $Al_2O_3$ | 2–45% |
| $TiO_2$ | 0–10% |
| FeO | 0–20% |
| CaO | 10–50% |
| MgO | 2–40% |
| $Na_2O$ | 0–10% |
| $K_2O$ | 0–10%. |

3. A process according to claim 2 in which the blend of asbestos cement and additive has an analysis, expressed by weight of oxides, which comprises:

| | |
|---|---|
| $SiO_2$ | 35–66% |
| $Al_2O_3$ | 2–35% |
| $TiO_2$ | 0–10% |
| FeO | 0–10% |
| CaO | 10–45% |
| MgO | 2–30% |
| $Na_2O + K_2O$ | 0–7%. |

4. A process according to any preceding claim in which the blend is formed of 60 to 80% asbestos cement and 20 to 40% additive.

5. A process according to any one of claims 1–3 in which at least 80% by weight of the additive is naturally occurring silicate material.

6. A process according to any one of claims 1–3 in which the naturally occurring silicate comprises quartz sand, sandstone, diabase, basalt, gabbro, pyroxenite, olivine sand, anorthosite, syenite, andesite, trachyte, diopside- or wollastonite-rich rocks, clay or kaolin.

7. A process according to any one of claims 1–3 in which substantially all the additive comprises quartz sand and olivine sand.

8. A process according to any one of claims 1–3 in which at least 50% by weight of the additive has a content of $SiO_2+Al_2O_3$ of at least 70% by weight.

9. A process according to any one of claims 1–3 in which the temperature of the molten blend is 1400° to 1550° C.

10. A process according to any one of claims 1–3 in which the molten blend is cast into shapes or is quenched and fractured into grains or is formed into man made vitreous fibre material.

11. A process according to any one of claims 1–3, comprising forming a melt from a charge comprising the solidified blend, and forming man made vitreous fibre material from the melt.

12. A process according to claim 1, in which the fibre material has a content of $Al_2O_3$ of 4% or below.

13. A process according to claim 12 in which the fibre material has the composition

| | |
|---|---|
| $SiO_2$ | 53.5–64% by weight |
| $Al_2O_3$ | ≦4% by weight |
| CaO | 10–20% by weight |
| MgO | 10–20% by weight |
| FeO | 6.5–9% by weight |
| $P_2O_5 + B_2O_3$ | 0–20% by weight. |

14. A process according to claim 12 in which the fibre has the composition

| | |
|---|---|
| $SiO_2$ | 53.5–65% by weight |
| $Al_2O_3$ | ≦4% by weight |
| CaO | 15–30% by weight |
| MgO | 5–15% by weight |
| FeO | ≦4% by weight |
| $P_2O_5 + B_2O_3$ | 0–20% by weight. |

* * * * *